(12) United States Patent
Gupta

(10) Patent No.: US 12,267,586 B2
(45) Date of Patent: Apr. 1, 2025

(54) INTERFACE FOR COMMUNICATING A THRESHOLD IN A CAMERA

(71) Applicant: Google LLC, Mountain View, CA (US)

(72) Inventor: Rachit Gupta, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 56 days.

(21) Appl. No.: 18/042,029

(22) PCT Filed: Jul. 19, 2021

(86) PCT No.: PCT/US2021/042239
§ 371 (c)(1),
(2) Date: Feb. 17, 2023

(87) PCT Pub. No.: WO2022/060465
PCT Pub. Date: Mar. 24, 2022

(65) Prior Publication Data
US 2023/0319399 A1 Oct. 5, 2023

Related U.S. Application Data

(60) Provisional application No. 63/080,369, filed on Sep. 18, 2020.

(51) Int. Cl.
*H04N 5/335* (2011.01)
*G06F 3/01* (2006.01)
(Continued)

(52) U.S. Cl.
CPC .......... *H04N 23/667* (2023.01); *G06F 3/016* (2013.01); *G06F 3/0488* (2013.01)

(58) Field of Classification Search
CPC .................................................. H04N 23/667
See application file for complete search history.

(56) References Cited

U.S. PATENT DOCUMENTS

| | | | |
|---|---|---|---|
| 7,868,919 B2 * | 1/2011 | Flannery | H04N 23/66 348/211.7 |
| 9,774,780 B1 | 9/2017 | Baldwin et al. | |

(Continued)

FOREIGN PATENT DOCUMENTS

| | | |
|---|---|---|
| CN | 110290326 | 9/2019 |
| WO | 2017140273 | 8/2017 |

(Continued)

OTHER PUBLICATIONS

"International Search Report and Written Opinion", Application No. PCT/US2021/042239, Nov. 8, 2021, 14 pages.
(Continued)

*Primary Examiner* — Gary C Vieaux
(74) *Attorney, Agent, or Firm* — McDonnell Boehnen Hulbert & Berghoff LLP

(57) ABSTRACT

This document describes techniques and systems that enable an interface for communicating a threshold in a camera. An electronic device recognizes an in-camera, drag gesture that triggers a camera application to switch modes from a real-time display mode (displaying real-time preview images in a viewfinder) to a buffer-display mode, which displays frames recorded in the camera buffer. During the motion of the drag gesture, the electronic device provides dynamic visual feedback indicating a relation between a drag distance of the drag gesture and a target threshold for the drag gesture. For simplicity and conciseness, the visual feedback can be combined with the virtual shutter control. After meeting the threshold, the user releases the touch input of the drag gesture and the system triggers the camera application to switch modes. This allows capture of a "missed" moment that was recorded in the camera buffer but not stored in non-volatile memory.

20 Claims, 5 Drawing Sheets

(51) Int. Cl.
*G06F 3/0488* (2022.01)
*H04N 23/667* (2023.01)

(56) References Cited

U.S. PATENT DOCUMENTS

| | | | |
|---|---|---|---|
| 9,942,486 B2 | 4/2018 | Molgaard et al. | |
| 2005/0001908 A1 | 1/2005 | Lee | |
| 2013/0222663 A1 | 8/2013 | Rydenhag et al. | |
| 2014/0192247 A1 | 7/2014 | Cheong et al. | |
| 2014/0282161 A1* | 9/2014 | Cash | G06F 3/017 715/769 |
| 2015/0334292 A1 | 11/2015 | Tartz et al. | |
| 2018/0091728 A1 | 3/2018 | Brown et al. | |
| 2019/0121530 A1 | 4/2019 | Christie et al. | |
| 2019/0208115 A1 | 7/2019 | Paul | |

FOREIGN PATENT DOCUMENTS

| | | |
|---|---|---|
| WO | 2019157387 | 8/2019 |
| WO | 2020076292 | 4/2020 |
| WO | 2022060465 | 3/2022 |

OTHER PUBLICATIONS

"Real-Time Feedback to Improve Selfifies for Low-Vision Users", Technical Disclosure Commons—https://www.tdcommons.org/dpubs_series/5114, May 4, 2022, 10 pages.

"Take motion photos & use Top Shot on your Pixel phone", Retrieved at: https://support.google.com/googlecamera/answer/9937175?hl-en - on Mar. 7, 2022, 3 pages.

White, et al., "EasySnap: Real-time Audio Feedback for Blind Photography", Oct. 2010, pp. 409-410.

* cited by examiner

INTERFACE FOR COMMUNICATING A THRESHOLD IN A CAMERA

RELATED APPLICATION(S)

This application is a national stage entry of International Application No. PCT/US2021/042239, filed Jul. 19, 2021, which claims the benefit of U.S. Provisional Application No. 63/080,369, filed Sep. 18, 2020, the disclosures which are incorporated herein by reference in their entirety.

RELATED APPLICATION(S)

Many electronic devices, particularly mobile phones, that include cameras generally operate in a predictable way, e.g., when a user initiates the camera, a viewfinder opens and a display presents images of a scene capturable in a field of view of the camera. In many digital cameras, the presented images are in real-time and the user can press the shutter button at the appropriate time to capture an image or video of the scene.

In some instances, however, the user may miss the "moment" they are attempting to capture. For example, the subject may have stopped smiling, the subject may have moved out of position or out of the field of view, or the user may belatedly press the shutter button. The camera captures an image (or burst of images) at the time of the button press. If the user presses the shutter button after the desired moment has passed, that particular moment in time is missed.

SUMMARY

This document describes techniques and systems that enable an interface for communicating a threshold in a camera. In particular, an electronic device recognizes an in-camera, drag gesture that triggers a camera application to switch modes from a real-time display mode (displaying real-time preview images in a viewfinder) to a buffer-display mode, which displays frames recorded in the camera buffer. During the motion of the drag gesture, the electronic device provides dynamic visual feedback indicating a relation between a drag distance of the drag gesture and a target threshold for the drag gesture. For simplicity and conciseness, the visual feedback can be combined with the virtual shutter control. After meeting the threshold, the user releases the touch input of the drag gesture and the system triggers the camera application to switch modes. This allows capture of a "missed" moment that was recorded in volatile memory (e.g., the camera buffer) but not stored in non-volatile memory (e.g., stored image gallery). The techniques and systems described herein may assist the user in performing a technical task of interactively searching and retrieving stored images more efficiently by means of a continued and/or guided human-machine interaction process.

In aspects, a method is described which includes executing a real-time display mode of a camera application of the electronic device, displaying real-time images of a scene in a field of view of an image sensor of the electronic device during the real-time display mode, and recording the real-time images to a plurality of frames of a camera buffer. The method further includes recognizing a drag gesture, the drag gesture comprising a sustained touch input that is dragged across at least a portion of a user interface of the electronic device. In addition, the method includes determining a relationship between a drag distance of the drag gesture and a target distance threshold. The method also dynamically alters a virtual shutter control according to the determined relationship between the drag distance of the drag gesture and the target distance threshold to visually convey the relationship to a user of the electronic device. Additionally, the method includes responsive to a determination that the drag distance is equal to or greater than the target distance threshold and that one or more of the touch inputs are removed from the user interface, triggering the camera application to switch modes from the real-time display mode to a buffer-display mode, the buffer-display mode configured to provide access to view the plurality of frames recorded in the camera buffer.

In some aspects, one or more computer readable storage media is disclosed that comprises instructions that, responsive to execution by a processor, cause the above method to be performed.

In aspects, an electronic device is described. The electronic device includes a camera system, a camera application, a camera buffer, and a gesture recognition module. The camera system is configured to capture images of a scene. The camera application is configured to operate the camera system in multiple modes, the multiple modes including a real-time display mode and a buffer-display mode. The camera buffer is configured to record the images in frames during the real-time display mode. The gesture recognition module is configured to recognize a drag gesture during the real-time display mode, dynamically alter a virtual shutter control according to a relationship between a drag distance of the drag gesture and a target distance threshold, and responsive to the drag distance being greater than the target distance threshold, trigger the camera application to switch modes from the real-time display mode to the buffer-display mode.

In some aspects, one or more computer-readable storage memory is described that comprises instructions that, responsive to execution by a processor, implement a gesture recognition module. The gesture recognition module is configured to recognize a drag gesture during a real-time display mode of a camera application of an electronic device, the real-time display mode configured to display real-time images as viewed through a viewfinder. The gesture recognition module is also configured to dynamically alter a virtual shutter control according to a relationship between a drag distance of the drag gesture and a target distance threshold. In addition, the gesture recognition module is configured to respond to the drag distance of the drag gesture being greater than the target distance threshold, and trigger the camera application to switch modes from the real-time display mode to a buffer-display mode that provides access to frames that are recorded in a camera buffer of a camera of the electronic device but not stored in a non-volatile memory of the electronic device.

It will be appreciated that features described in the context of one aspect may be combined with features of another aspect. For example, the features of the method aspect may be implemented by the system aspect and/or the computer-readable storage media aspect.

This summary is provided to introduce simplified concepts concerning an interface for communicating a threshold in a camera, which is further described below in the Detailed Description and Drawings. This summary is not intended to identify essential features of the claimed subject matter, nor is it intended for use in determining the scope of the claimed subject matter.

BRIEF DESCRIPTION OF THE DRAWINGS

The details of one or more aspects of an interface for communicating a threshold in a camera are described in this document with reference to the following drawings. The same numbers are used throughout the drawings to reference like features and components.

DETAILED DESCRIPTION

Overview

Figure 1:
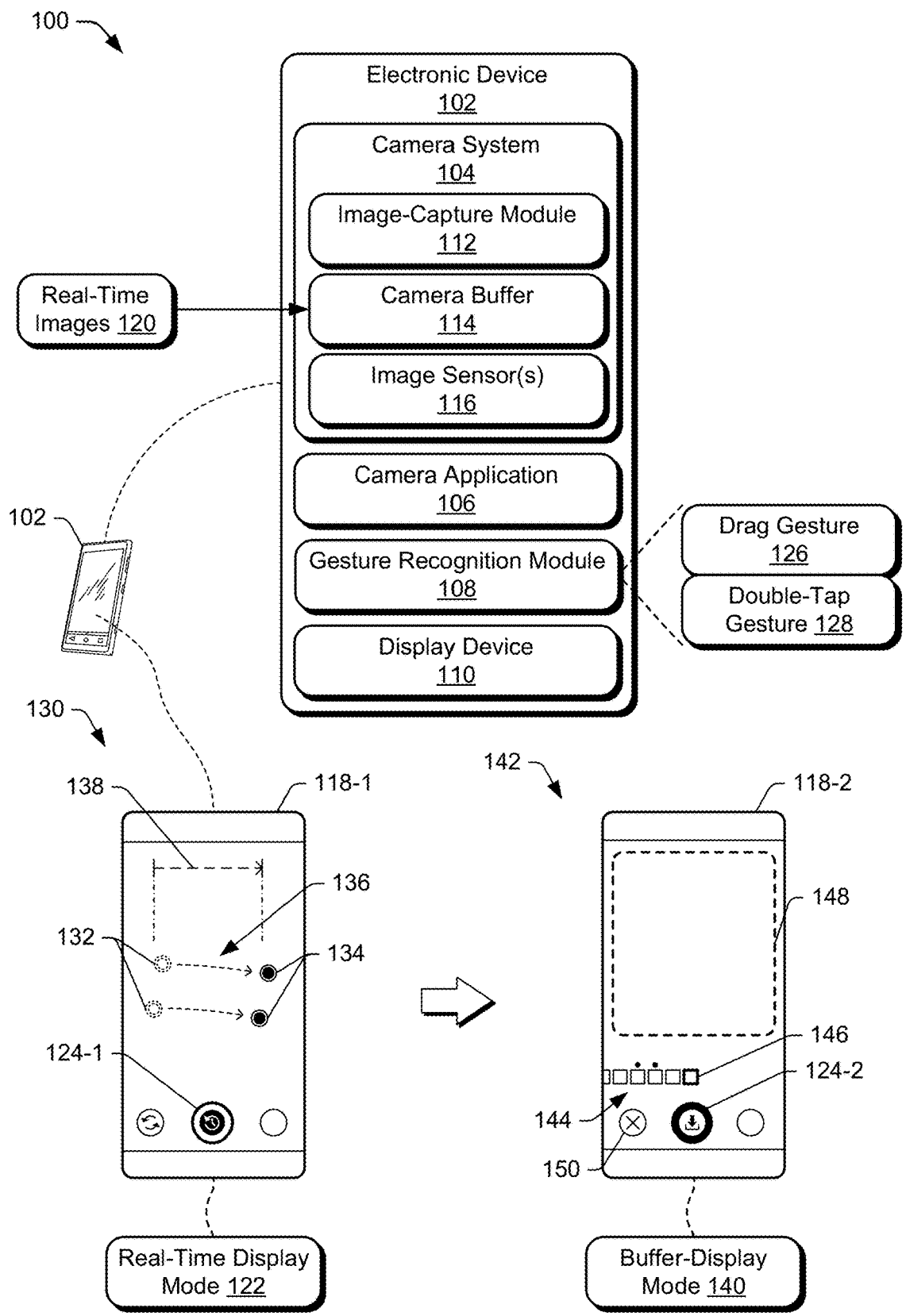
FIG. 1 illustrates an example environment in which techniques for an interface for communicating a threshold in a camera can be implemented.

In some instances, when a user uses a digital camera to attempt to capture an image of a moment in time of a subject, the user may press the shutter button too late (e.g., the subject has moved) resulting in the "moment" being missed. In such cases, by the time the user presses the shutter button, the desired moment in time has passed and is no longer available for capture as a digital image. Many digital cameras may include a buffer (e.g., ten-second buffer) that records the images shown in a viewfinder and continuously overwrites the recorded images during operation. Although the images are recorded in the buffer for the length of time allowed by the capacity of the camera buffer, none of the images are stored in non-volatile memory until the user activates the shutter button. When the user activates the shutter button, the camera captures an image of the scene at the time of the shutter-button activation and promptly clears the buffer. Accordingly, the images recorded in the buffer may be accessible for a short time prior to the activation of the shutter button and the clearing of the buffer. A user input may therefore be used to request access to view frames in the buffer, which may consequently close the viewfinder. Challenges arise, however, in preventing inadvertent access to the buffer because the user may not be prepared to close the viewfinder.

This document describes an interface for communicating a threshold in a camera. For example, when the camera is operating in a real-time display mode and displaying real-time images of a scene within the field of view of the camera, those images are recorded in a buffer of the camera but are not stored to a non-volatile memory (e.g., image gallery in storage memory) of the electronic device.

The user may provide an input, recognized by the electronic device as a gesture, to cause the electronic device to switch from the real-time display mode (e.g., showing real-time images) to a buffer-display mode, which provides a scrubber view of the images from the real-time display mode that have been recorded in the camera buffer over a duration of time corresponding to the capacity of the buffer (e.g., 10 seconds, 15 seconds, 60 seconds). In one example, when the gesture is recognized by the electronic device, the camera exits the real-time display mode, stops recording images into the buffer, and provides a view of the last ten seconds of recorded images. The user can scrub through the recorded images to find an image within the buffer that represents the "moment" they missed and select the desired image. The selected image may then be stored to the non-volatile memory of the electronic device for subsequent retrieval.

The gesture used to cause the camera to enter the buffer-display mode may include a drag gesture. The drag gesture may be generated by the user dragging one finger or multiple fingers (e.g., two, three, four, five) across the user interface (e.g., display screen) in a sustained manner. A threshold can be used to determine whether the user intends to trigger the mode switch, which may provide more-accurate gesture recognition and reduce false triggers, providing performance-oriented improvements to the detection of input. In addition, the electronic device may communicate to the user a visual indication of a distance traveled by the drag gesture relative to a predetermined threshold distance for triggering the mode switch. While there are many ways to communicate this visual indication to the user, one example is to use the display of the virtual shutter control to provide the visual indication. Alternatively, an additional display element, such as a status bar, a progress bar, or an icon can be used to provide a visual indication of the relationship of the drag gesture to, and the progress toward, the threshold. However, combining the visual indication with the virtual shutter control may reduce clutter on the display and consume less area on the display, making the display less complicated in comparison to using an additional display element for the visual indication.

Accordingly, using the techniques described herein, the electronic device provides an in-camera, visual indication on the virtual shutter control that conveys the progress of a drag gesture, which is controlled by a user during the real-time display mode, toward a target threshold (e.g., a threshold drag distance). When the target threshold is met and the user lifts their fingers from the display, the camera switches modes from the real-time display mode to the buffer-display mode, which may include changing the display of the shutter control. Essentially, the shutter control changes states (e.g., from a first state to a second state) and the state change is controlled by the user. Using the techniques described herein, a mechanism enabling user input may be provided, allowing a user to submit a command for switching camera modes from a real-time display mode to a buffer-display mode, which may assist the user in efficiently searching and retrieving stored images via the buffer-display mode. Further discussion of these and other features is described in more detail below.

These are but a few examples of how the described techniques and devices may be used to enable an interface for communicating a threshold in a camera and enabling user input. Other examples and implementations are described throughout this document. The document now turns to an example operating environment, after which example devices, methods, and systems are described.

Operating Environment

FIG. 1 illustrates an example environment 100 in which techniques enabling an interface for communicating a threshold in a camera can be implemented. The example environment 100 includes an electronic device 102 (e.g., user device), which includes, or is associated with, a camera system 104, a camera application 106, a gesture recognition module 108, and a display device 110. As further described below, the camera system 104 can include, among other features, an image-capture module 112, a camera buffer 114, and an image sensor 116.

When the camera system 104 is executing, a user interface 118-1 may be displayed via the display device 110. The user interface 118-1 may present real-time images/video representing a view through a viewfinder (e.g., a scene detected within a field of view of the image sensor 116).

The camera application 106 can be implemented or executed to provide access to and operate the camera system 104 (e.g., opening the shutter, capturing images and videos, providing a preview mode representing a view through the viewfinder). The image-capture module 112 can be implemented to record the real-time images/video (e.g., real-time images 120), detected by the image sensor 116 during a real-time display mode 122 (e.g., the preview mode) of the camera system 104, into volatile memory (e.g., the camera buffer 114) of the camera system 104. The camera buffer 114 may include random access memory (RAM), including dynamic RAM or static RAM. The image-capture module 112 can record the real-time images 120 detected by the image sensor at any suitable frame rate, including four frames per second (fps), six fps, ten fps, 20 fps, and so forth. Depending on the size of the camera buffer 114, a limited number of frames can be included therein. The image-capture module 112 can continue to overwrite the real-time images 120 recorded in the camera buffer 114, e.g., in a first-in-first-out manner, essentially maintaining images of the last "X" amount of seconds in the camera buffer 114 as time progresses. The image-capture module 112 can also be implemented to, in response to a user input that activates a virtual shutter control (e.g., shutter control 124), capture an image of the scene within the field of view of the image sensor 116 and store the image in non-volatile memory (e.g., read-only memory (ROM), erasable ROM, hard disk drive (HDD), flash memory, optical disc, magnetic tape).

The gesture recognition module 108 can be implemented to recognize a user input as a particular gesture and map that gesture to a function to be performed by an operating system of the electronic device 102 or an active application running on the electronic device 102, such as the camera application 106. Example gestures that can be recognized within the camera application 106 include, among other gestures, a drag gesture 126 (e.g., single-touch drag gesture or multi-touch drag gesture) and a double-tap gesture 128.

An example of the drag gesture 126 is illustrated in view 130 of the user interface 118-1. In this example, during the real-time display mode 122 and without activating the shutter control 124-1, the user touches the user interface 118-1 with multiple fingers (e.g., two fingers) to provide a multi-touch input at initial locations 132. Then, the user drags their fingers across the user interface 118-1 toward final locations 134. During the drag of the multi-touch input, the gesture recognition module 108 determines a horizontal distance component 136 between the initial locations 132 and a current location of the touch inputs. The gesture recognition module 108 compares the horizontal distance component 136 of the drag to a target threshold (e.g., distance threshold 138). Although the example described herein determines a horizontal distance component 136 (orthogonal to a longitudinal axis (shown in FIG. 3A) of the electronic device 102 in a portrait orientation), any suitable directional component of the drag gesture 126 across the display device 110 can be used (e.g., directional component that is parallel to a direction of the longitudinal axis of the electronic device 102).

Also, during the drag motion, the virtual shutter control 124 is gradually altered (e.g., changes color and/or states) to visually convey relative progress of the drag gesture 126 toward the distance threshold 138. For example, and as further described below, the shutter control 124 may include a white ring that is gradually replaced, portion-by-portion around the ring to black. The black color may begin on the left side to correspond to the initial locations 132 that are on the left side of the user interface 118-1, and grow or travel along the ring in both directions (clockwise and counter-clockwise) until they meet on the right side (corresponding to the final locations 134 of the user input on the right side of the user interface 118-1) as the distance threshold 138 is met. In other examples, the shutter control 124 may be altered in width, shape, size, color, and/or brightness in addition to, or in lieu of, the above-example. In aspects, the virtual shutter control 124 is dynamically altered in a manner proportionate to a difference between a length of a directional component of the multi-touch drag gesture and a length of the distance threshold 138. The dynamic alterations of the shutter control 124 provide visual feedback, which conveys the progress of the drag toward the target threshold and helps a user understand how far to drag the touch inputs to reach the distance threshold 138 for triggering the corresponding function.

After the distance threshold 138 is met and the user lifts their fingers off the user interface 118-1, the gesture recognition module 108 triggers the camera application 106 to switch modes. As an example, the camera application 106 may switch from the real-time display mode 122 to a buffer-display mode 140, an example of which is shown in view 142. The buffer-display mode 140 includes a display of content recorded in the camera buffer 114. In the illustrated example, a user interface 118-2, representing the buffer-display mode 140, shows a scrubber 144 of frames recorded in the camera buffer 114. A currently selected (e.g., highlighted) frame 146 may be enlarged and displayed in a display area 148. The user can scroll along the scrubber 144 to view other frames that were recorded in the camera buffer 114 prior to switching modes.

In some aspects, the virtual shutter control 124 may change states based on the mode switch. In one example, the virtual shutter control 124 may transition from a first icon (e.g., first shutter control 124-1) to a second icon (e.g., second shutter control 124-2). The second shutter control 124-2 provides an indication of different functionality associated with activating the shutter control 124. For example, the first shutter control 124-1 may include a symbol representing to the user that activating the shutter control may trigger the image-capture module 112 to capture an image of the scene shown in the viewfinder. The second shutter control 124-2 may include a different symbol (e.g., download symbol) representing to the user that activating the shutter control 124 (e.g., the first shutter control 124-1 or the second shutter control 124-2) at this point in time (e.g., during the buffer-display mode 140) may trigger the image-capture module 112 to store the currently-selected frame from the camera buffer to non-volatile memory (e.g., image gallery). In this case, the shutter does not open to capture a new image. The user may select any number of frames from the scrubber 144 to store to the image gallery. Then, the user may exit the buffer-display mode 140 by activating an exit command (e.g., exit icon 150). Based on the exit command, the camera application 106 may exit the buffer-display mode 140 and re-enter the real-time display mode 122, enter the image gallery, or exit the camera application 106 altogether.

As an alternative example, the gesture recognition module 108 can recognize the double-tap gesture 128 based on multiple tap inputs (e.g., two taps) to a particular region on the user interface 118-1. In this case, because the double-tap gesture 128 does not include a drag distance, the gesture recognition module 108 can, in response to detecting the double-tap gesture 128 in a particular region (e.g., left half) of the user interface 118-1, trigger the mode switch of the camera application 106 from the real-time display mode 122 to the buffer-display mode 140. In other aspects, the mode switch can be triggered in response to a user input that selects a menu item or other display element included on the user interface 118-1.

Figure 2:
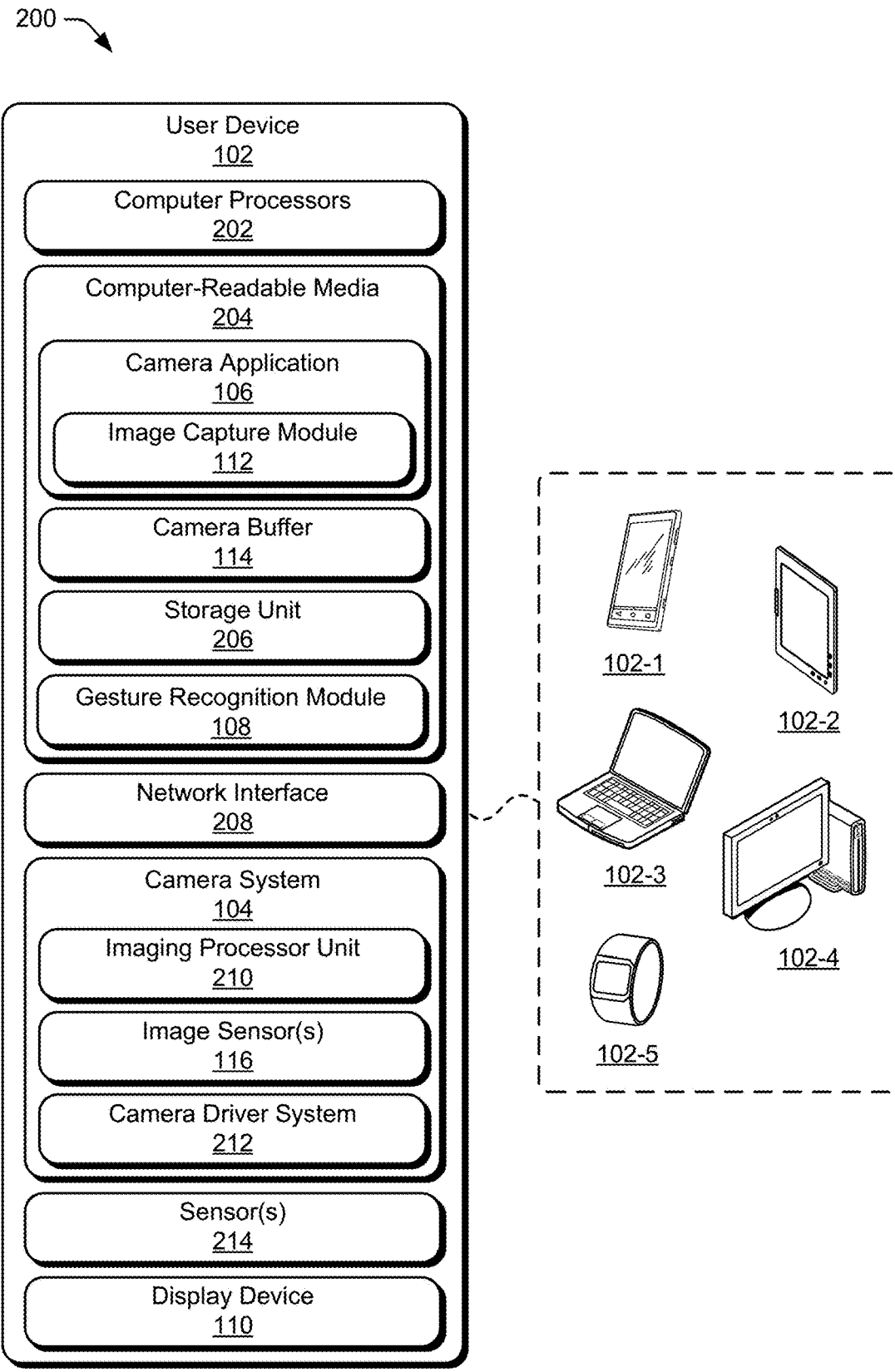
FIG. 2 illustrates an example implementation of the electronic device of FIG. 1 in more detail.

In more detail, consider FIG. 2, which illustrates an example implementation 200 of the electronic device 102 that can implement an interface for communicating a threshold in a camera. The electronic device 102 of FIG. 2 is illustrated with a variety of example devices, including a smartphone 102-1, a tablet 102-2, a laptop 102-3, a desktop computer 102-4, and a computing watch 102-5. The electronic device 102 can also include other devices, such as televisions, entertainment systems, audio systems, gaming systems, automobiles, drones, track pads, drawing pads, netbooks, e-readers, home security systems, and other home appliances. Note that the electronic device 102 can be wearable, non-wearable but mobile, or relatively immobile (e.g., desktops and appliances).

The electronic device 102 also includes one or more computer processors 202 and one or more computer-readable media 204, which includes memory media and storage media. Applications (e.g., the camera application 106) and/or an operating system (not shown) implemented as computer-readable instructions on the computer-readable media 204 can be executed by the computer processors 202 to provide some or all of the functionalities described herein. For example, the computer-readable media 204 can include the image-capture module 112 and the gesture recognition module 108.

The computer-readable media 204 also includes non-volatile memory, such as a storage unit 206, in which images that are captured by the image sensor 116 can be stored. The storage unit 206 is configured to store a gallery of images that are (i) captured by the image sensor(s) 116 based on activation of the shutter control 124 during the real-time display mode 122 or (ii) obtained from selected frames in the camera buffer 114 based on activation of the shutter control 124 during the buffer-display mode 140.

The electronic device 102 may also include a network interface 208. The electronic device 102 can use the network interface 208 for communicating data over wired, wireless, or optical networks. By way of example and not limitation, the network interface 208 may communicate data over a local-area-network (LAN), a wireless local-area-network (WLAN), a personal-area-network (PAN), a wide-area-network (WAN), an intranet, the Internet, a peer-to-peer network, point-to-point network, or a mesh network.

Various implementations of the camera system 104 can include a System-on-Chip (SoC), one or more Integrated Circuits (ICs), a processor with embedded processor instructions or configured to access processor instructions stored in memory, hardware with embedded firmware, a printed circuit board with various hardware components, or any combination thereof.

The camera system 104 includes an imaging processor unit 210, the one or more image sensors 116, and a camera driver system 212. The camera driver system 212 enables communication between the camera system 104 and other components of the electronic device 102, such as the computer processors 202, the image-capture module 112, and the gesture recognition module 108. The camera driver system 212 can be initiated by any suitable trigger, such as a user input received via an actuated control or pressed button, or a signal received from one or more sensors 214.

The one or more sensors 214 of the electronic device 102 can include any of a variety of sensors, such as an audio sensor (e.g., a microphone), a touch-input sensor (e.g., a touchscreen), an image-capture device (e.g., a camera or video-camera), proximity sensors (e.g., capacitive sensors), an ambient light sensor (e.g., photodetector), or a haptic sensor (e.g., piezoelectric actuators, eccentric rotating mass (ERM) actuators, linear resonant actuators (LRA)). In at least some implementations, the electronic device 102 can include a radar system (not shown) to detect a proximity of the user to the electronic device 102, and based on that proximity, initiate one or more components and/or functions, such as initiating the camera system 104 and the image-capture module 112 to initiate an operate camera mode, including the real-time display mode 122 in FIG. 1. In some instances, the electronic device 102 can use haptic sensor(s) to cause a vibration response to indicate completion of the drag gesture 126 or that the drag gesture 126 has met the distance threshold 138.

The electronic device 102 can also include a display device, such as the display device 110. The display device 110 can include any suitable display device, such as a touchscreen, a liquid crystal display (LCD), thin film transistor (TFT) LCD, an in-place switching (IPS) LCD, a capacitive touchscreen display, an organic light-emitting diode (OLED) display, an active-matrix organic light-emitting diode (AMOLED) display, super AMOLED display, and so forth.

These and other capabilities and configurations, as well as ways in which entities of FIG. 1 act and interact, are set forth in greater detail below. These entities may be further divided, combined, and so on. The environment 100 of FIG. 1 and the detailed illustrations of FIG. 2 through FIG. 4 illustrate some of many possible environments and devices capable of employing the described techniques.

Example Implementations

Figure 3A:
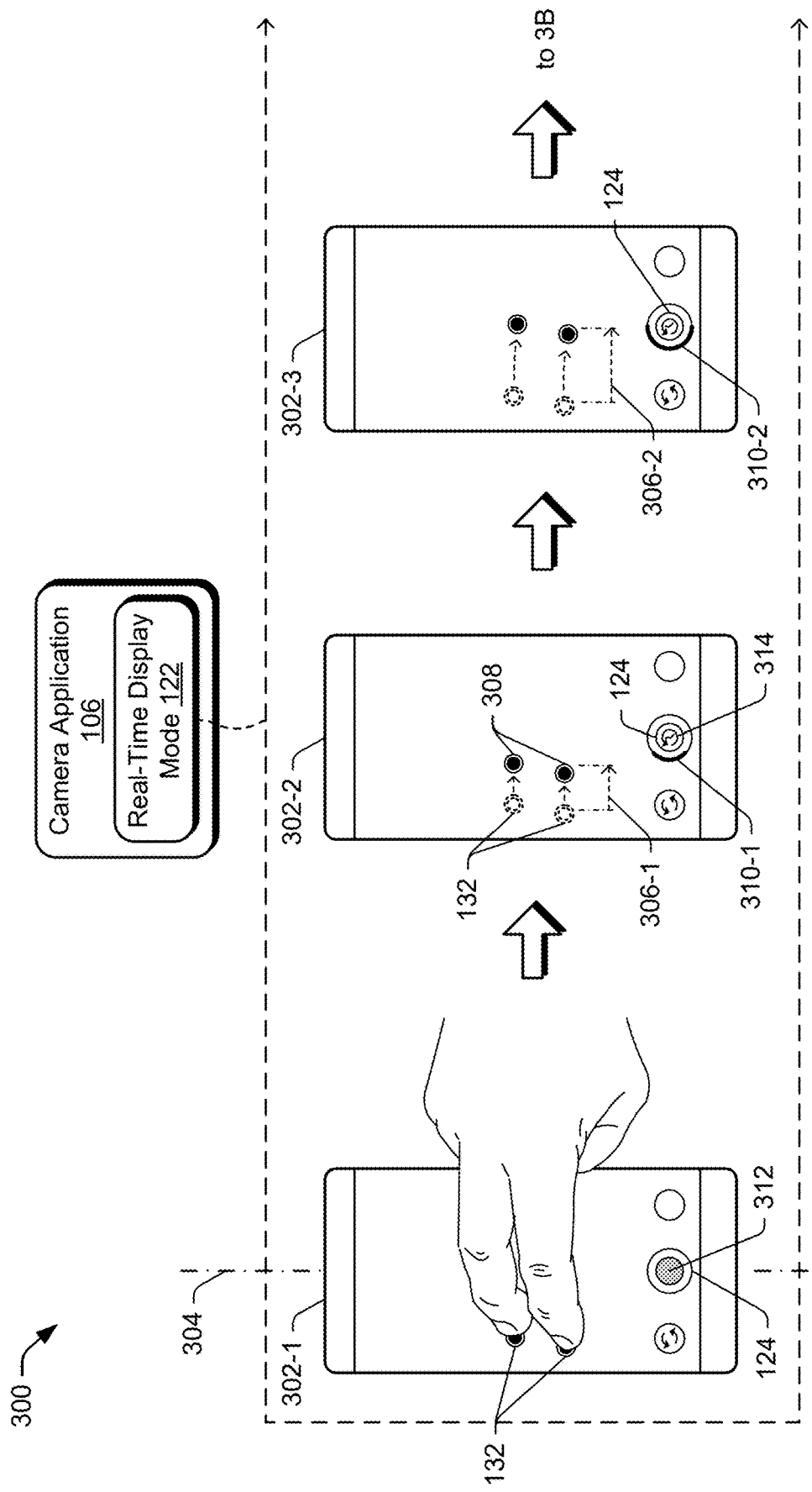
FIGS. 3A and 3B illustrate example implementations of an interface for communicating a gesture threshold in a camera based on a drag gesture.
Figure 3B:
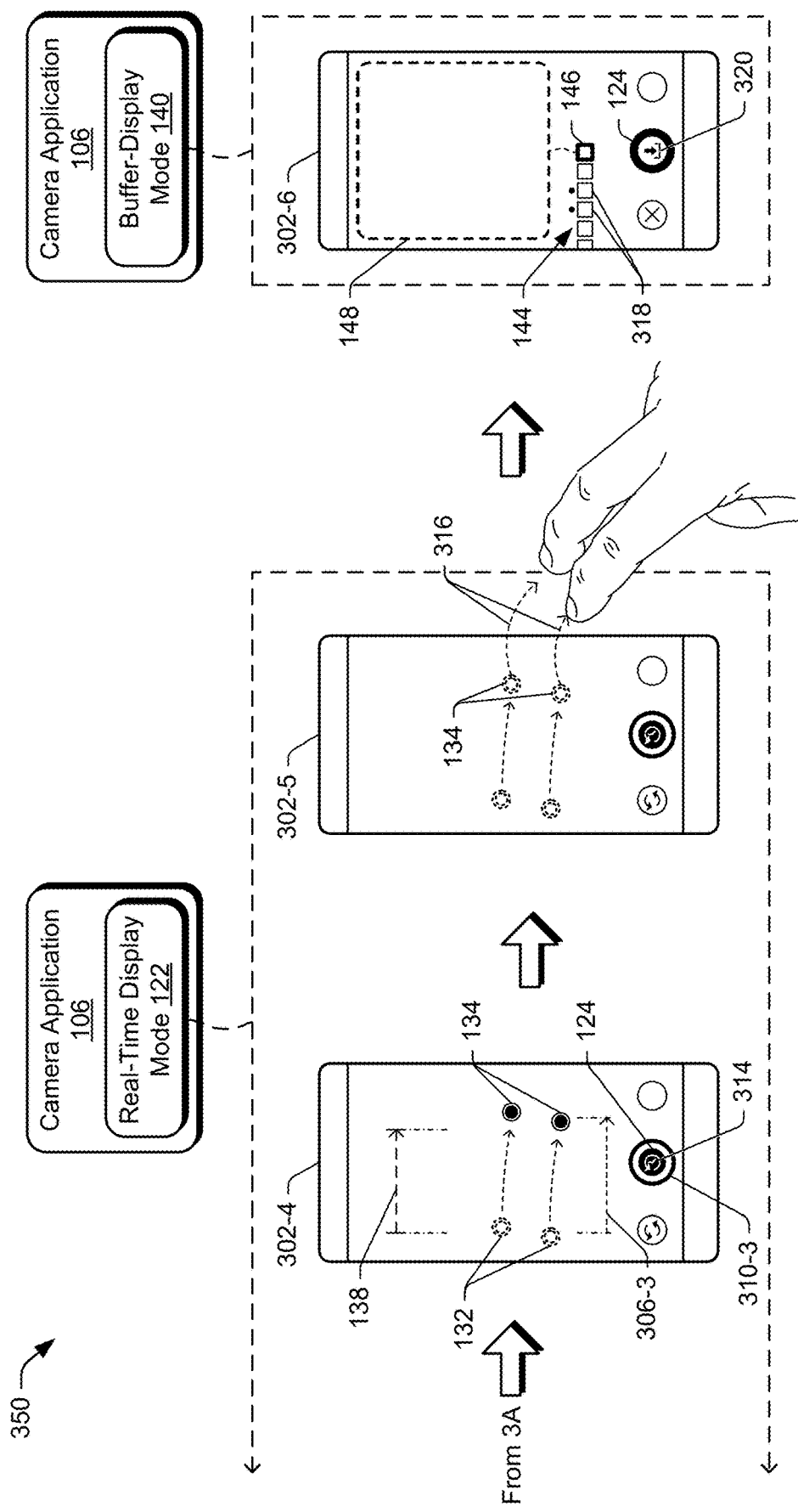
Figure 4:
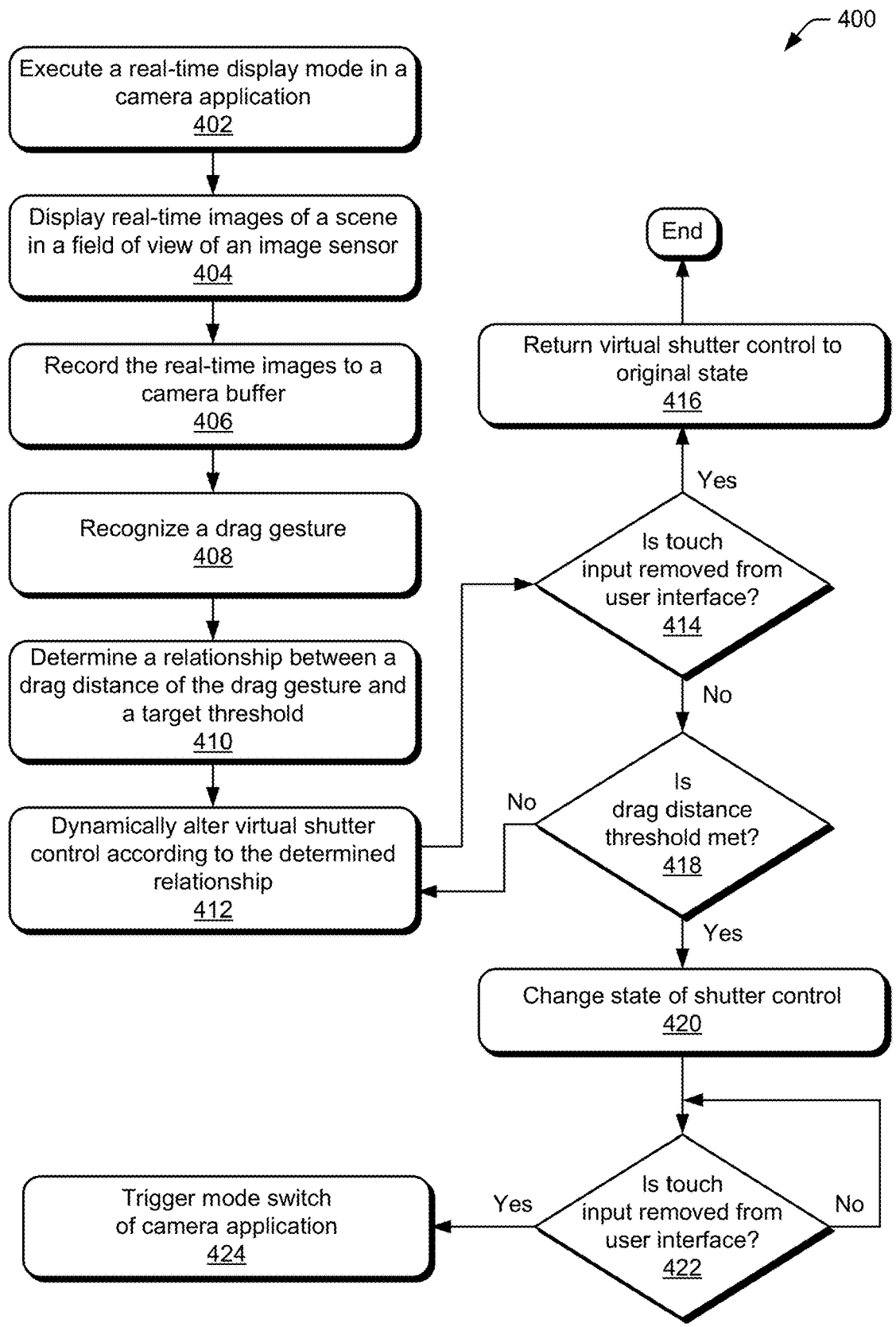
FIG. 4 depicts an example method for communicating a threshold in a camera.

FIGS. 3A and 3B illustrate example implementations 300 and 350, respectively, of an interface for communicating a threshold in a camera based on a multi-touch drag gesture. The example implementations 300 and 350 illustrate a user interface 302 (e.g., the user interface 118) in different instances 302-1, 302-2, 302-3, 302-4, 302-5, and 302-6. When the camera application 106 is operating in the real-time display mode 122, the electronic device 102 displays real-time images or video representing a view through the viewfinder. If the user is holding the electronic device 102 to capture an image displayed in the viewfinder and a desired moment in time passes before the user is able to activate the shutter control 124 (e.g., the user missed their opportunity to capture the desired moment in an image), the user can initiate the drag gesture 126 by placing at least two fingers on the user interface 302 and then dragging those fingers across the user interface 302.

With reference to the instance 302-1 of the user interface 302, the user touches the user interface 302 at the initial locations 132 prior to activating the shutter control 124 and while the camera application 106 is operating in the real-time display mode 122. In the illustrated example, the electronic device 102 is held in a portrait orientation with a longitudinal axis 304 being substantially vertical. Other orientations (e.g., landscape or any other orientation) are also contemplated and the described techniques are not limited to the illustrated example.

Then, as illustrated in the instance 302-2, the user begins to drag the touch inputs across the user interface 302-2. In this example, the touch inputs are dragged in a direction that is substantially horizontal relative to the user's perspective.

Although a lateral direction relative to the longitudinal axis 304 is described herein for dragging the touch inputs, any suitable direction can be used. The electronic device 102 (e.g., the gesture recognition module 108) monitors or measures the length of the drag (e.g., drag distance 306-1) throughout the drag motion. In the instance 302-2, the touch inputs have been dragged from the initial locations 132 to new locations 308.

To provide a visual indication 310 of the user's progress toward a target threshold for the drag gesture, the shutter control 124 begins to change. For example, beginning on the same side of the shutter control 124 as the touch input is to the user interface 302 (e.g., left side of the shutter control 124 to correspond to the touch inputs being on the left side of the user interface 302), the shutter control 124 begins to change color. Here, the ring of the shutter control 124 begins to thicken on the left side to provide a visual indication 310-1 of the relative progress of the length of the drag toward the target threshold for the drag gesture. In addition, a center portion of the shutter control 124 may also be modified. In a first state 312, the shutter control 124 includes a darkened circle. As the user begins to drag the touch inputs across the user interface 302, shutter control 124 transitions from the first state 312 to a second state 314 (e.g., the first shutter control 124-1 in FIG. 1), which includes a different icon or symbol (e.g., an icon that indicates a threshold is to be met) in the center portion of the shutter control 124. This transition may be triggered when the drag gesture meets an initial distance threshold (e.g., five millimeters (mm), 10 mm, 12 mm, 15 mm).

As the touch inputs are dragged farther across the user interface 302, corresponding changes are made to the shutter control 124. For example, in the instance 302-3, drag distance 306-2 is now greater than the drag distance 306-1, and the change (e.g., visual indication 310-2) to the shutter control 124 is also greater. Here, the visual indication 310-2 is indicating that the length of the drag of the touch inputs is approximately halfway to meeting the target threshold.

Continuing with FIG. 3B, the user has continued to drag the touch inputs across the user interface 302 and in the instance 302-4, the user has now dragged the touch inputs to the final locations 134. In this example, the drag distance 306-3 between the initial locations 132 and the final locations 134 meets the distance threshold 138 of the gesture. To notify the user that the threshold has been met, the shutter control 124 is completely visually modified. For instance, visual indication 310-3 shows the ring of the shutter control 124 completely thickened and the center icon also darkened. Additionally, haptic sensors may fire to provide a haptic indication (e.g., vibration of the electronic device 102) that the distance threshold 138 has been met. At instance 302-5, the user may remove their fingers from the user interface 302, as illustrated by arrows 316. The removal of the user's fingers from the user interface 302 (at instance 302-5) after the distance threshold 138 has been met indicates completion of the drag gesture 126, which triggers a mode switch in the camera application 106. The camera application 106 exits the real-time display mode 122 and enters the buffer-display mode 140 (shown in instance 302-6) to enable access to the frames recorded in the camera buffer 114 but not stored in storage memory (e.g., the storage unit 206 of the electronic device 102 shown in FIG. 2). In addition, the camera application 106 stops recording frames to the camera buffer 114.

During the drag gesture, if the user removes their fingers from the user interface 302 at any point in time before meeting the distance threshold 138, the gesture is terminated and the camera application 106 remains in the real-time display mode 122. Additionally, the visual indication 310 of the relative progress toward the distance threshold 138 is removed and the shutter control 124 returns to its first state 312.

In the buffer-display mode 140, the user can view the scrubber 144 of frames recorded in the camera buffer 114, including a display of the selected (e.g., highlighted) frame 146 in the display area 148. In some aspects, the electronic device 102 may analyze the frames in the camera buffer 114 and determine a number of "best" images from the recorded frames, based on various factors including lighting, clarity, focus, subject placement, smile, open eyes, and so on. These "best" images of the frames in the camera buffer 114 can be identified for the user in a conspicuous manner. In one example, a dot may be displayed proximate to the corresponding frame, as illustrated by example frames 318. Any suitable technique may be used to identify such frames to make it easier and quicker for the user to locate the frame(s) they want to keep.

In addition, the shutter control 124 may change from the second state 314 to a third state 320 (e.g., the second shutter control 124-2 in FIG. 1), when entering the buffer-display mode 140 because the shutter control 124 may now be used to trigger a different function. For example, the shutter control 124 in the buffer-display mode 140 no longer activates the shutter to capture an image using the image sensor(s) 116. Rather, the shutter control 124 may now be used to store the selected frame 146 to storage memory, such as in an image gallery in the storage unit 206 of the electronic device 102. For this reason, in the third state of the shutter control 124, the center portion may include a different icon or symbol than the first and second states 312 and 314.

Accordingly, the drag gesture 126 described herein provides a way for the user to access the camera buffer 114 to view frames recorded over the last, e.g., ten seconds, and locate the "moment" (image) within that time period that they failed to capture. The threshold may be used to confirm the user's intent to switch modes and to reduce false triggers of the mode switch. The shutter control 124 may be used to convey the progress of the drag toward the target threshold to enable the user to understand the relationship between the drag and the drag distance required (e.g., the threshold) to trigger the mode switch. The user can then select a particular frame from the camera buffer 114 and activate the shutter control 124 to store the corresponding image to the image gallery.

Example Methods

FIG. 4 depicts an example method 400 for implementing an interface for communicating a threshold in a camera. The method 400 can be performed by the electronic device 102, which uses (i) the image-capture module 112 to operate the camera system 104 in the real-time display mode 122 and (ii) the gesture recognition module 108 to recognize user input as a particular gesture mapped to a particular function, such as the drag gesture 126 for triggering a mode switch to the buffer-display mode 140 of FIG. 1.

The method 400 is shown as a set of blocks that specify operations performed but are not necessarily limited to the order or combinations shown for performing the operations by the respective blocks. Further, any of one or more of the operations may be repeated, combined, reorganized, or linked to provide a wide array of additional and/or alternate methods. In portions of the following discussion, reference may be made to the example operating environment 100 of FIG. 1 or to entities or processes as detailed in FIGS. 2, 3A, and 3B, reference to which is made for example only. The techniques are not limited to performance by one entity or multiple entities operating on one device.

At 402, an electronic device executes a real-time display mode in a camera application of the electronic device. The real-time display mode may be the real-time display mode 122 of the camera application 106 of the electronic device 102.

At 404, the camera application displays real-time images or video of a scene in a field of view of an image sensor of a camera system of the electronic device. The image sensor may be the image sensor(s) 116 of the camera system 104. The displayed real-time images or video represent a view through a viewfinder of the camera system 104.

At 406, an image-capture module of the electronic device records the real-time images in a camera buffer of the camera system. The camera buffer may be the camera buffer 114 of the camera system 104. The image-capture module may be the image-capture module 112 and may record the images to the camera buffer 114. The camera buffer 114 may include a number of frames that are continuously overwritten in a first-in-first-out manner during operation of the camera application 106 in the real-time display mode 122.

At 408, a gesture recognition module of the electronic device recognizes a drag gesture on a user interface of the electronic device. The gesture recognition module 108 of the electronic device 102 may recognize the drag gesture 126 on the user interface 302 (e.g., user interface 118-1). The drag gesture 126 may include multiple concurrent and sustained touch inputs that are dragged across at least a portion of the user interface 302. Alternatively, the drag gesture 126 may include a single touch input that is dragged across at least a portion of the user interface 302 in a sustained manner.

At 410, the electronic device determines a relationship between a drag distance of the drag gesture and a target threshold. The target distance may be the distance threshold 138, which is a predetermined distance to be met by the drag gesture to trigger the corresponding function.

At 412, the electronic device dynamically alters a virtual shutter control based on a distance that the touch inputs are dragged across the user interface. The virtual shutter control may be the shutter control 124. Any suitable parameter or feature of the shutter control 124 may be modified, including color, brightness, state, shape, size, width, and so forth. For example, the virtual shutter control 124 can be changed from the first state 312 to the second state 314, as described above. The alteration may be dynamic to visually correspond to the distance travelled by the touch inputs of the drag gesture relative to a target threshold used to complete the gesture. The dynamic alteration to the shutter control 124 provides visual feedback corresponding to the drag gesture to visually convey to the user the relationship between the drag distance and the target threshold.

At 414, the gesture recognition module determines if one or more of the touch inputs have been removed from the user interface during the drag gesture. If the user removes one or more of their fingers from the user interface during the drag gesture (and prior to meeting the target threshold) ("YES" at 414), then at 416 the virtual shutter control 124 is returned to its original state (e.g., the first state 312) and the method 400 is ended. If the touch inputs are maintained on the user interface (e.g., user maintains contact with the touch surface of the display device 110) ("NO" at 414), then the method 400 proceeds to 418.

At 418, the gesture recognition module determines whether the drag distance of the drag gesture has met the target threshold. The target threshold may be the distance threshold 138. For example, the gesture recognition module 108 may determine if the distance travelled by the touch inputs of the drag gesture is greater than the distance threshold 138. If the target threshold is not met ("NO" at 418), the gesture recognition module 108 returns to 412 and continues to monitor the drag gesture relative to the target threshold.

If the target threshold is met ("YES" at 418), then at 420 the gesture recognition module changes the state of the shutter control. For example, the gesture recognition module 108 can, as described above, change the state of the virtual shutter control 124 from the second state 314 to the third state 320 to visually communicate to the user that the target threshold has been met. Haptics can also be used to tactilely communicate to the user that the target threshold has been met.

At 422, the gesture recognition module determines if one or more of the touch input(s) has been removed from the user interface. If the user maintains contact with the user interface at this point ("NO" at 422), the gesture recognition module 108 continues to monitor the drag gesture. Further, the image-capture module 112 continues to record frames in the camera buffer 114. In some aspects, the user may reverse the direction of the drag gesture (not shown) and the gesture recognition module 108 may correspondingly reverse the alterations to the shutter control 124.

If the touch input(s) are removed from the user interface ("YES" at 422), then at 424 the gesture recognition module triggers a mode switch of the camera application. For example, the camera application 106 switches from the real-time display mode 122 to the buffer-display mode 140, as described above. Using the distance threshold 138 in combination with the release of the touch input provides a high likelihood of the user's intention to trigger the functionality associated with the drag gesture (e.g., mode switch) and a low likelihood that the input was inadvertent or unintended.

Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Some examples are described below:

Example 1: A method comprising: executing a real-time display mode of a camera application of an electronic device; displaying real-time images of a scene in a field of view of an image sensor of the electronic device during the real-time display mode; recording the real-time images to a plurality of frames of a camera buffer; recognizing a drag gesture, the drag gesture comprising multiple concurrent and sustained touch inputs that are dragged across at least a portion of a user interface of the electronic device; determining a relationship between a drag distance of the drag gesture and a target distance threshold; dynamically altering a virtual shutter control according to the determined relationship between the drag distance of the drag gesture and the target distance threshold to visually convey the relationship to a user of the electronic device; and responsive to a determination that the drag distance is equal to or greater than the target distance threshold and that one or more of the touch inputs are removed from the user interface, triggering the camera application to switch modes from the real-time display mode to a buffer-display mode, the buffer-display mode configured to provide access to view the plurality of frames recorded in the camera buffer.

Example 2: The method of example 1, further comprising: changing a state of the virtual shutter control from a first state to a second state in response to the drag distance being greater than an initial distance threshold that is less than the target distance threshold.

Example 3: The method of example 2, further comprising: responsive to the determination that the drag distance is greater than the target distance threshold, changing the state of the virtual shutter control from the second state to a third state to visually communicate that the drag gesture has met the target distance threshold.

Example 4: The method of any preceding example, further comprising: responsive to the determination that the drag distance is greater than the target distance threshold, providing a haptic response to indicate that the drag gesture has met the target distance threshold.

Example 5: The method of any preceding example, further comprising: displaying a scrubber view of the plurality of frames recorded in the camera buffer; and displaying an image corresponding to a selected frame of the plurality of the frames.

Example 6: The method of example 5, further comprising: during the buffer-display mode, receiving an input that activates the virtual shutter control; and responsive to the activation of the virtual shutter control during the buffer-display mode, causing the image corresponding to the selected frame to be stored in memory of the electronic device.

Example 7: The method of any preceding example, wherein dynamically altering the virtual shutter control includes altering one or more parameters of the virtual shutter control proportionate to a difference between a length of a directional component of the drag distance and a length of the target distance threshold.

Example 8: The method of example 7, wherein the one or more parameters include color, brightness, state, shape, or size.

Example 9: The method of any preceding example, further comprising: responsive to triggering the camera application to switch modes from the real-time display mode to the buffer-display mode, causing the camera application to stop recording frames in the camera buffer.

Example 10: An electronic device comprising: a camera system configured to capture images of a scene; a camera application configured to operate the camera system in multiple modes, the multiple modes including a real-time display mode and a buffer-display mode; a camera buffer configured to record the images in frames during the real-time display mode; and a gesture recognition module configured to: recognize a drag gesture during the real-time display mode; dynamically alter a virtual shutter control according to a relationship between a drag distance of the drag gesture and a target distance threshold; and responsive to the drag distance being greater than the target distance threshold, trigger the camera application to switch modes from the real-time display mode to the buffer-display mode.

Example 11: The electronic device of example 10, wherein: the real-time display mode includes a display of real-time images as viewed through a viewfinder; and the buffer-display mode includes a view of the frames recorded in the camera buffer.

Example 12: The electronic device of example 11, wherein the camera buffer records the images in the frames in a first-in-first-out manner.

Example 13: The electronic device of example 10, wherein the gesture recognition module is configured to recognize the drag gesture prior to activation of the virtual shutter control.

Example 14: The electronic device of example 10, wherein the drag gesture includes multiple concurrent and sustained touch inputs that are dragged across at least a portion of a user interface of the electronic device.

Example 15: The electronic device of example 10, wherein the gesture recognition module is configured to dynamically alter the virtual shutter control by altering one or more parameters of the virtual shutter control according to the relationship between the drag distance and the target distance threshold.

Example 16: The electronic device of example 15, wherein the one or more parameters include color, brightness, state, shape, width, or size.

Example 17: The electronic device of example 10, wherein the gesture recognition module is configured to dynamically alter the virtual shutter control by transitioning the virtual shutter control from a first state to a second state.

Example 18: The electronic device of example 10, wherein the gesture recognition module is configured to cause, subsequent to the camera application being triggered to switch modes from the real-time display mode to a buffer-display mode, the camera application to stop recording frames in the camera buffer.

Example 19: The electronic device of example 10, further comprising an image-capture module configured to: responsive to activation of the virtual shutter control during the buffer-display mode, cause an image corresponding to a selected frame in the camera buffer to be stored to an image gallery.

Example 20: One or more computer readable storage media comprising instructions that, responsive to execution by a processor, implement a gesture recognition module configured to: recognize a drag gesture during a real-time display mode of a camera application of an electronic device, the real-time display mode configured to display real-time images as viewed through a viewfinder; dynamically alter a virtual shutter control according to a relationship between a drag distance of the drag gesture and a target distance threshold; and responsive to the drag distance of the drag gesture being greater than the target distance threshold, trigger the camera application to switch modes from the real-time display mode to a buffer-display mode that provides access to frames that are recorded in a camera buffer of a camera of the electronic device but not stored in a non-volatile memory of the electronic device.

Example 21: One or more computer readable storage media comprising instructions that, responsive to execution by a processor, cause the method of any one of examples 1 to 9 to be performed.

Conclusion

Although implementations of techniques for, and apparatuses enabling, an interface for communicating a threshold in a camera have been described in language specific to features and/or methods, it is to be understood that the subject of the appended claims is not necessarily limited to the specific features or methods described. Rather, the specific features and methods are disclosed as example implementations of an interface for communicating a threshold in a camera.

What is claimed is:

1. A method comprising:
   executing a real-time display mode of a camera application of an electronic device;
   displaying real-time images of a scene in a field of view of an image sensor of the electronic device during the real-time display mode;
   recording the real-time images to a plurality of frames of a camera buffer;
   recognizing a drag gesture, the drag gesture comprising a sustained one or more touch inputs that are dragged across at least a portion of a user interface of the electronic device;
   determining a relationship between a drag distance of the drag gesture and a target distance threshold;
   dynamically altering a virtual shutter control according to the determined relationship between the drag distance of the drag gesture and the target distance threshold to visually convey the relationship to a user of the electronic device; and
   responsive to a determination that the drag distance is equal to or greater than the target distance threshold and that one or more of the touch inputs are removed from the user interface, triggering the camera application to switch modes from the real-time display mode to a buffer-display mode, the buffer-display mode configured to provide access to view the plurality of frames recorded in the camera buffer.

2. The method of claim 1, further comprising:
   changing a state of the virtual shutter control from a first state to a second state in response to the drag distance being greater than an initial distance threshold that is less than the target distance threshold.

3. The method of claim 2, further comprising:
   responsive to the determination that the drag distance is greater than the target distance threshold, changing the state of the virtual shutter control from the second state to a third state to visually communicate that the drag gesture has met the target distance threshold.

4. The method of claim 1, further comprising:
   responsive to the determination that the drag distance is greater than the target distance threshold, providing a haptic response to indicate that the drag gesture has met the target distance threshold.

5. The method of claim 1, further comprising:
   displaying a scrubber view of the plurality of frames recorded in the camera buffer; and
   displaying an image corresponding to a selected frame of the plurality of the frames.

6. The method of claim 5, further comprising:
   during the buffer-display mode, receiving an input that activates the virtual shutter control; and
   responsive to the activation of the virtual shutter control during the buffer-display mode, causing the image corresponding to the selected frame to be stored in memory of the electronic device.

7. The method of claim 1, wherein dynamically altering the virtual shutter control includes altering one or more parameters of the virtual shutter control proportionate to a difference between a length of a directional component of the drag distance and a length of the target distance threshold.

8. The method of claim 7, wherein the one or more parameters include color, brightness, state, shape, width, or size.

9. The method of claim 1, further comprising:
   responsive to triggering the camera application to switch modes from the real-time display mode to the buffer-display mode, causing the camera application to stop recording frames in the camera buffer.

10. An electronic device comprising:
    a camera system configured to capture images of a scene;
    a camera application comprising first computer-readable instructions stored on computer-readable media and executable by one or more processors to operate the camera system in multiple modes, the multiple modes including a real-time display mode and a buffer-display mode;
    a camera buffer configured to record the images in frames during the real-time display mode; and
    a gesture recognition module comprising second computer-readable instructions stored on the computer-readable media and executable by the one or more processors to:
    recognize a drag gesture during the real-time display mode;
    dynamically alter a virtual shutter control according to a relationship between a drag distance of the drag gesture and a target distance threshold; and
    responsive to the drag distance being greater than the target distance threshold, trigger the camera application to switch modes from the real-time display mode to the buffer-display mode.

11. The electronic device of claim 10, wherein the camera application is configured to:
    operate the camera system in the real-time display mode by displaying real-time images as viewed through a viewfinder; and
    operate the camera system in the buffer-display mode by displaying a view of the frames recorded in the camera buffer.

12. The electronic device of claim 10, wherein the gesture recognition module is configured to recognize the drag gesture by recognizing multiple concurrent and sustained touch inputs that are dragged across at least a portion of a user interface of the electronic device.

13. The electronic device of claim 10, wherein the gesture recognition module is configured to dynamically alter the virtual shutter control by altering one or more parameters of the virtual shutter control according to the relationship between the drag distance and the target distance threshold.

14. The electronic device of claim 10, wherein the gesture recognition module is configured to dynamically alter the virtual shutter control by transitioning the virtual shutter control from a first state to a second state.

15. One or more non-transitory computer readable storage media comprising instructions that, responsive to execution by a processor, cause operations to be performed comprising:
    executing a real-time display mode of a camera application of an electronic device;
    displaying real-time images of a scene in a field of view of an image sensor of the electronic device during the real-time display mode;
    recording the real-time images to a plurality of frames of a camera buffer;

recognizing a drag gesture, the drag gesture comprising a sustained one or more touch inputs that are across at least a portion of a user interface of the electronic device;

determining a relationship between a drag distance of the drag gesture and a target distance threshold;

dynamically altering a virtual shutter control according to the determined relationship between the drag distance of the drag gesture and the target distance threshold to visually convey the relationship to a user of the electronic device; and responsive to a determination that the drag distance is equal to or greater than the target distance threshold and that one or more of the touch inputs are removed from the user interface, triggering the camera application to switch modes from the real-time display mode to a buffer-display mode, the buffer-display mode configured to provide access to view the plurality of frames recorded in the camera buffer.

16. The one or more computer readable storage media of claim 15, wherein the operations further comprise changing a state of the virtual shutter control from a first state to a second state in response to the drag distance being greater than an initial distance threshold that is less than the target distance threshold.

17. The one or more computer readable storage media of claim 16, wherein the operations further comprise changing, responsive to the determination that the drag distance is greater than the target distance threshold, the state of the virtual shutter control from the second state to a third state to visually communicate that the IO drag gesture has met the target distance threshold.

18. The one or more computer readable storage media of claim 15, wherein the operations further comprise providing, responsive to the determination that the drag distance is greater than the target distance threshold, a haptic response to indicate that the drag gesture has met the target distance threshold.

19. The one or more computer readable storage media of claim 15, wherein the operations further comprise:
displaying a scrubber view of the plurality of frames recorded in the camera buffer; and
displaying an image corresponding to a selected frame of the plurality of the frames.

20. The one or more computer readable storage media of claim 15, wherein dynamically altering the virtual shutter control includes altering one or more parameters of the virtual shutter control proportionate to a difference between a length of a directional component of the drag distance and a length of the target distance threshold.

\* \* \* \* \*